United States Patent [19]

Wittwer et al.

[11] 3,899,800

[45] Aug. 19, 1975

[54] WINDSHIELD WIPER BLADE

[75] Inventors: Robert O. Wittwer, Portage; William H. Harbison, Merrillville, both of Ind.

[73] Assignee: The Anderson Company, Gary, Ind.

[22] Filed: Aug. 22, 1974

[21] Appl. No.: 499,971

[52] U.S. Cl. ............................................ 15/250.42
[51] Int. Cl. ............................................. B60s 1/02
[58] Field of Search ................. 15/250.36–250.42, 250.35, 250.32

[56] References Cited
UNITED STATES PATENTS

| | | | |
|---|---|---|---|
| 2,697,241 | 12/1954 | Oishei | 15/250.42 |
| 2,741,792 | 4/1956 | Ehrlich et al. | 15/250.42 |
| 3,022,532 | 2/1962 | Zaiger | 15/250.42 |
| 3,846,864 | 11/1974 | Baut et al. | 15/250.42 |

FOREIGN PATENTS OR APPLICATIONS 858,220   1/1961   United Kingdom.............. 15/250.42

*Primary Examiner*—Peter Feldman
*Attorney, Agent, or Firm*—Wegner, Stellman, McCord, Wiles & Wood

[57] ABSTRACT

A windshield wiper blade is provided which has a wiping element and backing strip precurved in a direction generally parallel to the curvature of the surface of a windshield. The superstructure of the blade has four pairs of claws for applying pressure to the backing strip at four equally spaced apart points with the two extreme points being located one-eighth of the length of the blade in from each end of the blade. The precurving and the location of the pressure points provides better wiping quality, less wind lift and less wiper element permanent set.

8 Claims, 5 Drawing Figures

WINDSHIELD WIPER BLADE

BACKGROUND OF THE INVENTION

1. Field of the Invention

This invention relates to windshield wiper blade assemblies and, more particularly, to a precurved backing strip adapted to receive pressure from a superstructure at four equally spaced points with the outermost points being spaced inwardly from the ends of said backing strip.

2. Description of the Prior Art

Wiper blades have been designed since the 1940's to make use generally of the concept of a superstructure operatively connected to a backing strip embedded in a resilient wiping element for transmitting pressure from a wiper arm to a plurality of spaced apart points on the backing strip so as to conform the resilient wiping element to the shape of a windshield to be wiped. In all of these constructions it was believed to be necessary that the pressure, at least at the outer ends of the blade, be applied as close to the outer ends of the blade as was possible. In many blade designs, this is still true. However, it has been found that with the pressure points applied to the outer ends of the blade, sufficient pressure is not always available to retain the central portion of the blade on the windshield with sufficient force to prevent the central portion of the blade from lifting from the windshield due to the pressure of wind sweeping over the windshield.

It has also been found that due to the application of pressure at the outer ends of the blade, the resilient wiping element was depressed more in certain areas than in others resulting in permanent set to the wiping element which affected the ability of the wiping element to properly wipe the surface of the glass.

It was also commonly believed that it was necessary to bow the backing strip and wiping element outwardly, away from the central portion of the superstructure so that the pressure from the wiper arm on the superstructure first overcame the precurvature of the blade before conforming the blade to the shape of the surface to be wiped. The bowing effect was believed to provide greater forces at the center of the blade for holding the center of the blade against the surface of the windshield.

SUMMARY OF THE INVENTION

To overcome the problems of wind lift and permanent set to the wiping element, it has been found that locating the remote pressure points inward from the ends of the wiper blade element by an amount equal to one-eighth the length of the blade and to provide the pressure points at four equally spaced points therebetween, produces a wiper blade that is less likely to lift due to the wind pressure and has been found to be substantially free from permanent set in the wiper element after prolonged use on a windshield.

By precurving the backing strip so that the wiper blade element assumes a shape substantially paralleling the curvature of the windshield to be wiped when combined with the four equally spaced pressure points with the remote pressure points being located one-eighth of the length of the blade inward from the ends of the blade, produces a wiping element which very effectively wipes the surface of the windshield and does not lift in the center due to wind currents and does not create permanent set after long periods of storage of the blade on a windshield.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 2:
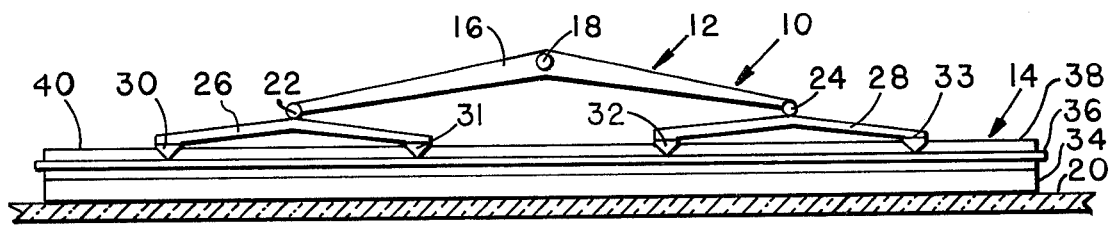
FIG. 2 is an elevational view of a windshield wiper blade assembly positioned on a windshield showing a triple yoke superstructure.

Referring to the drawings and, in particular, FIG. 2, a windshield wiper blade assembly 10 is illustrated and has a superstructure 12 operatively connected to a wiper blade element 14. The superstructure 12 is comprised of a primary yoke 16 which is adapted to be connected at 18 to the end of a windshield wiper arm (not shown) which arm applies pressure to the wiper blade assembly and provides the forces for moving the wiper blade transversely across the surface of a windshield 20 to be wiped. The primary yoke 16 is pivotally connected at its ends 22 and 24 to the midpoints of a pair of substantially identical secondary yokes 26 and 28. The secondary yokes 26 and 28 have on each end portion thereof pairs of inwardly opening claws 30, 31 and 32, 33, respectively.

Figure 1:
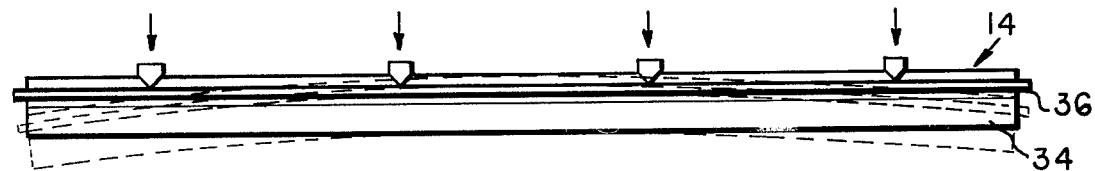
FIG. 1 is a wiper blade element schematically showing four equally spaced pressure points and, in phantom, shows the precurvature of the element prior to assembly on a windshield.

The wiper blade element 14, as shown in both FIGS. 1 and 2, is comprised of a resilient wiping member 34 and a flexible backing strip or flexor 36. The backing strip 36 is nested in a pair of sidewardly opening grooves formed in the head portion 38 of said wiping member 34. The flexible backing strip 36 is formed of an appropriate metal or plastic material and is an elongate planar member which is relatively flexible in a direction perpendicular to the surface being wiped and is relatively inflexible in a plane transverse thereto, i.e., in a plane substantially parallel to the surface to be wiped. The flexible backing strip 36 is precurved or prebowed in a direction substantially parallel to the curvature of the windshield. That is, the curvature of the backing strip 36 and wiper element 14 will be bowed inwardly so that the central portion will be closer to the central portion of the superstructure 12.

The superstructure 12 with the four pairs of equally spaced apart claws 30, 31 and 32, 33 slidably engage with the flexible backing strip 36 by means of the claws engaging around the outer exposed edge portions of said flexible backing strip. The remote claws 30, 33 of the secondary yokes 26 and 28 each engage with the backing strip at a location spaced one-eighth the length of the wiper blade element in from the ends thereby creating an overhang or cantilever portion 40 at each end of the wiper blade assembly 10 with the four points of pressure being applied to the backing strip at equally spaced apart locations between said remote pressure points beneath the claws 30, 33. In this way, pressure from the wiper arm will be distributed to four equally spaced apart points along the backing strip with the two remote points being located one-eighth the length of the wiper element in from the ends of the blades so that as the blade is brought against the surface of the windshield, the pressure will conform the wiping lip of the wiping member 34 to the curvature of the surface of the windshield and since the pressure points are equally spaced, particularly over the central three-fourths of the blade, more pressure will be exerted in the central portion of the blade than in the prior art blades to hold the central portion of the blade against the surface of the windshield thereby preventing the blade from lifting from the windshield under the forces created by a strong wind current across the windshield. The wiping lip on the cantilever portion 40 of the blade will be held against the surface of the windshield by the remote pressure points 30, 33 and by the reverse flexor bow and will provide an excellent wipe along the outer regions of the blade. The central portion of the blade, due to the even distribution of pressure to the wiper element, likewise performs an excellent wipe throughout said central portion of the assembly.

Figure 3:
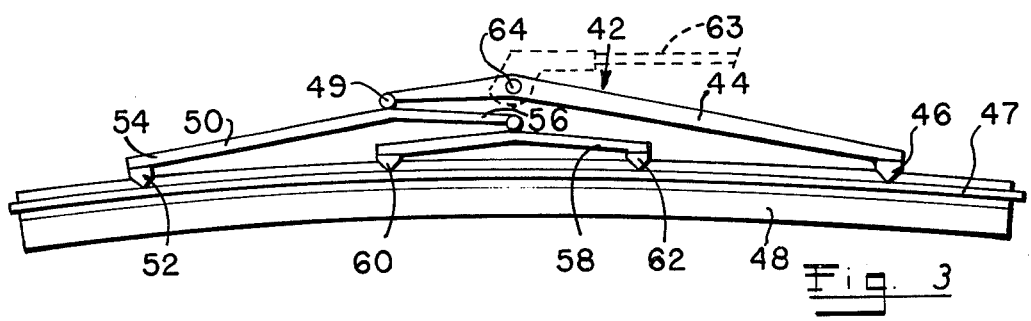
FIG. 3 is an elevational view of a windshield wiper blade assembly showing a modified form of superstructure.

FIG. 3 illustrates a modified form of superstructure 42 for accomplishing the same basic pressure distribution concept as is taught in FIG. 2. That is, the primary yoke 44 has a pair of claws 46 at one end portion slidably connected to the inboard portion of the backing strip 47 of the wiper blade element 48 at a location one-eighth the length of the wiper blade 48 in from the end thereof. The other end of the primary yoke 44 is pivotally connected at 49 to a link 50 which link has claws 52 at its remote end 54 slidably connected to the outboard portion of the backing strip 47 of the wiper blade 48 at a location one-eighth the length of the wiper blade in from the end thereof. The other end of the link 50 is pivotally connected at 56 to the midpoint of a secondary yoke 58 which has pairs of claws 60, 62 at the outer ends thereof which claws engage with the backing strip 47 of the wiper blade element 48 at points equally spaced from each other and from the claws 46 and 52 of the primary yoke 44 and of the link 50, respectively. The primary yoke 44 and the link 50 are unsymmetrical in that the pressure received at 64 and 49, respectively, is off center with respect to the ends of said yoke and link, however, the geometry of the superstructure 42 is such that the pressure received at 64 from the arm 63 is transmitted equally to the four pairs of claws 46, 62, 60 and 52. In this way, the pressure from the wiper arm 63, shown in phantom, which arm is connected at 64 to the primary yoke 44, is distributed equally to four equally spaced apart points 46, 60, 62, 52 along the backing strip with the remote points 46, 52 being located one-eighth the length of the wiper blade element in from the ends thereof. The backing strip is precurved or prebowed in a convex direction with respect to the superstructure as is described with respect to FIG. 2.

Figure 4:
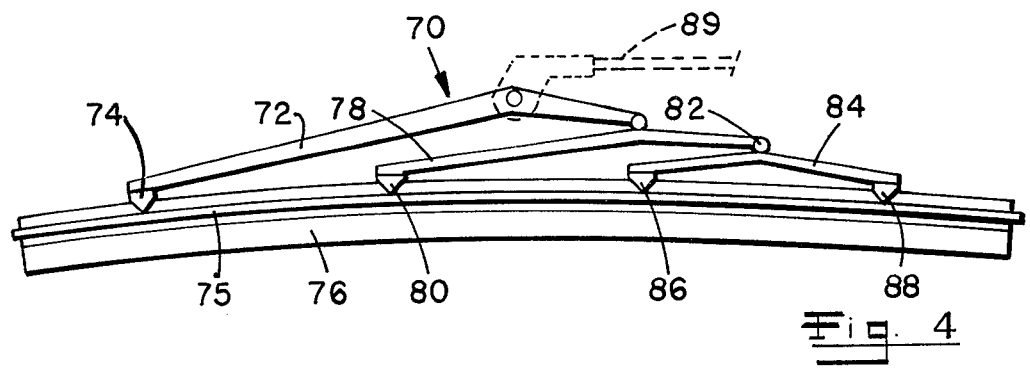
FIG. 4 is an elevational view of a windshield wiper blade assembly having still another modified form of superstructure; and, FIG. 5 shows an elevational view of a windshield wiper blade assembly having still another modified form of superstructure.

The modification shown in FIG. 4 includes a superstructure 70, somewhat similar to the superstructure 42 of FIG. 3, but with the link reversed in relation to the primary yoke. That is, the primary yoke 72 has claws 74 at the one end thereof engaging with the outboard portion of the backing strip 75 of the wiper blade element 76 instead of engaging the inboard portion of the wiping element as was the case in FIG. 3. The link 78 has claws 80 on the one end portion which slidably engage with backing strip 75 at a location beneath the primary yoke 72 with the other end of the link 78 being pivotally connected at 82 to the midpoint of the secondary yoke 84 which has claws 86, 88 slidably engaging with the backing strip 75. The more remote pair of claws 88 slidably engage the backing strip 75 at a location one-eighth the length of the wiper blade element 76 in from the end thereof. The primary yoke 72 and the link 78 are unsymmetrical, the same as described with respect to FIG. 3, but will transmit pressure received from a wiper arm 89 (shown in phantom) equally to the claws 74, 80, 86, 88. The claws 74, 80, 86, 88 create pressure points on the wiper blade element 76 at equally spaced apart locations from each other with the remote claws or pressure points 74, 88 being located one-eighth the length of the wiper blade element in from the ends thereof.

Figure 5:
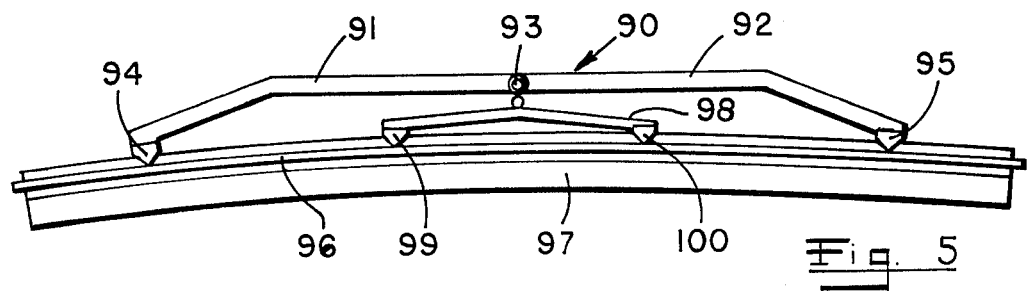

FIG. 5 shows still a further modification of a superstructure 90 wherein the primary yoke is made up of a pair of arms 91, 92 pivotally connected together by a pin 93 at the inner ends thereof. The outer ends of the arms 91, 92 have claws 94, 95 slidably engaging with the backing strip 96 of the wiper blade element 97. The claws engage the backing strip 96 at locations one-eighth the length of the wiper blade element in from the ends thereof. A secondary yoke 98 is pivotally connected at its midpoint to the arms 91, 92 by means of the pin 93 and has pairs of claws 99, 100 at the remote ends thereof slidably engaging with the backing strip 96 of the wiper blade element. A coil spring (not shown) is wrapped around the pin 93 within the confines of the channel shape of the arms 91, 92 and urges the outer (claw) ends of said arms toward the windshield. The claws 94, 99, 100 and 95 of the superstructure contact the backing strip 96 at equally spaced apart locations with the outboard claws 94, 95 engaging the backing strip 96 at locations one-eighth the length of the wiper blade element in from the ends thereof.

Since this invention is directed to the precurving of the backing strip in a direction to substantially parallel the curvature of a windshield being wiped in combination with the equally spaced apart claws engaging with the backing strip to create equally spaced apart pressure points with the remote pressure points being located one-eighth the length of the backing strip in from the ends thereof, no detailed description is set out for retaining the superstructure assembled on the backing strip. Conventional methods such as the use of abutments formed on the backing strip such as shown in Anderson U.S. Pat. No. 2,924,839, the use of end clips such as shown in DePew U.S. Pat. No. 2,983,945 and the use of releasable connections between the primary and secondary yokes such as shown in Anderson U.S. Pat. No. 2,897,530, would be typical of operative structures for retaining the superstructure on the wiper blade element.

We claim:

1. A wiper blade for wiping a curved windshield, said wiper blade having a resilient wiping element, a flexible backing strip nested in said wiping element and being curved in a direction generally paralleling the curvature of the windshield, and a superstructure operatively connected to said backing strip to transmit pressure from a wiper arm to said backing strip and to said wiping element, said superstructure having a primary member and at least one secondary member, said primary member being connected to said wiper arm and to the midpoint of said secondary member, said secondary member having a pair of claws on each end thereof with said pairs of claws being spaced from each other an amount equal to one-fourth the length of said wiping element, the outboard pair of claws of said secondary member engaging said backing strip one-eighth the length of said wiping element in from one end thereof, and means connected to the other end of said primary member for applying pressure to said backing strip at two spaced apart points with the outboard pressure point being applied one-eighth of the length of the wiping element in from the other end thereof.

2. A wiper blade having a resilient wiping element, a flexible backing strip nested in said wiping element, and a superstructure operatively connected to said backing strip and to a wiper arm, said superstructure having at least two articulated members for dividing pressure received from the wiper arm into four equally spaced apart pressure points on said backing strip, the two remote pressure points engage said backing strip one-eighth the length of said wiping element in from each end of said backing strip.

3. A wiper blade as claimed in claim 2 wherein said backing strip is curved with the central portion closer to the central portion of said superstructure.

4. A wiper blade as claimed in claim 2 wherein said superstructure comprises a primary yoke and a pair of secondary yokes, said secondary yokes being connected to the opposite ends of said primary yoke and having pairs of claws at each end thereof engaging with said backing strip at said equally spaced apart points.

5. A wiper blade as claimed in claim 2 wherein said superstructure comprises a primary yoke connected at one end to said backing strip and connected at its other end to a link, said link being connected at one end to said backing strip and being connected at the other end to a secondary yoke, said secondary yoke being connected to said backing strip at two of said equally spaced apart points.

6. A wiper blade as claimed in claim 2 wherein said superstructure comprises a pair of arms pivoted together at the inner ends thereof and being connected to said backing strip at the outer ends thereof, and a secondary yoke connected to said arms at the inner ends thereof and being connected to said backing strip at two of said equally spaced apart points.

7. A wiper for cleaning a windshield comprising a pressure-distributing superstructure, a wiper blade element having a resilient wiping member, a flexible backing strip operatively associated with said wiping member, said superstructure having a primary yoke and a pair of substantially identical secondary yokes, said secondary yokes being pivotally connected at their midpoints to the opposite ends of said primary yoke, said secondary yokes have pairs of claws at each end thereof which claws are adapted to slidably engage with said backing strip at equally spaced apart locations thereon, the remote pairs of claws of each secondary yoke engage said backing strip at locations one-eighth the length of the blade element from the ends thereof whereby the end portions of said blade element overhang the remote pairs of claws of said superstructure.

8. A wiper for cleaning a windshield comprising a pressure-distributing superstructure, a wiper blade element having a resilient wiping member and, a flexible backing strip operatively associated with said wiping member, said superstructure having a plurality of articulated link means with four pairs of claws formed thereon, said claws slidably engaging with said backing strip at four equally spaced apart locations thereon, the remote pairs of claws engaging said backing strip at locations one-eighth the length of the wiper blade element in from the ends thereof whereby the end portions of said wiper blade element overhang the remote pairs of claws of said superstructure.

* * * * *